US007873769B2

United States Patent
Kim

(10) Patent No.: US 7,873,769 B2
(45) Date of Patent: Jan. 18, 2011

(54) MICRO CONTROLLER UNIT (MCU) CAPABLE OF INCREASING DATA RETENTION TIME AND METHOD OF DRIVING THE MCU

(75) Inventor: Eung Man Kim, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 340 days.

(21) Appl. No.: 11/850,583

(22) Filed: Sep. 5, 2007

(65) Prior Publication Data
US 2008/0189461 A1 Aug. 7, 2008

(30) Foreign Application Priority Data
Feb. 7, 2007 (KR) ...................... 10-2007-0012561

(51) Int. Cl.
*G06F 13/24* (2006.01)
(52) U.S. Cl. ...................... 710/260; 710/305; 713/300; 372/143
(58) Field of Classification Search ......... 710/260–269, 710/305–306; 320/136; 713/300, 340; 372/143
See application file for complete search history.

(56) References Cited

U.S. PATENT DOCUMENTS

| 5,560,023 | A | * | 9/1996 | Crump et al. ............... 713/323 |
| 7,293,188 | B2 | * | 11/2007 | Espinor et al. .............. 713/340 |
| 2006/0067188 | A1 | * | 3/2006 | Umehara et al. ......... 369/47.15 |
| 2006/0076934 | A1 | * | 4/2006 | Ogata et al. ................. 320/136 |

FOREIGN PATENT DOCUMENTS

| KR | 95-16026 | 6/1995 |
| KR | 1020010069304 | 7/2001 |

OTHER PUBLICATIONS

English Abstract for Publication No: 95-16026.
English Abstract for Publication No: 1020010069304.

* cited by examiner

*Primary Examiner*—Mark Rinehart
*Assistant Examiner*—Kim T Huynh
(74) *Attorney, Agent, or Firm*—F. Chau & Associates, LLC

(57) ABSTRACT

A method of operating a micro controller unit including maintaining a stop mode operation when a battery level detected in response to a first interrupt signal input from an external source is in a predetermined low voltage level range during the stop mode operation, and performing a normal operation corresponding to a second interrupt signal input from the external when a battery voltage level detected in response to the second interrupt signal is higher than the highest voltage level belonging to the predetermined low voltage level range.

12 Claims, 5 Drawing Sheets

MICRO CONTROLLER UNIT (MCU) CAPABLE OF INCREASING DATA RETENTION TIME AND METHOD OF DRIVING THE MCU

CROSS-REFERENCE TO RELATED PATENT APPLICATION

This application claims priority under 35 U.S.C. §119 from Korean Patent Application No. 2007/0012561, filed on Feb. 7, 2007, the disclosure of which is hereby incorporated by reference in its entirety.

BACKGROUND OF THE INVENTION

1. Field of the Invention

The present invention relates to a semiconductor device, and more particularly, to a micro controller unit (MCU) capable of increasing a data retention time.

2. Description of Related Art

Typically, electronic devices using batteries, such as, cellular phones, notebook computers, personal digital assistants (PDAs), and remote controllers, include memory devices, such as non-volatile memory devices or volatile memory devices, micro controller units (MCUs), etc.

Whether an MCU of an electronic device using a battery or batteries can operate or not may be determined according to a voltage level supplied by the battery/batteries. When the supplied voltage level decreases to a level less than or equal to a predetermined voltage level, the MCU cannot normally operate. Thus, the MCU included in the electronic device using the battery/batteries is likely to malfunction when the supplied voltage level deviates from the predetermined voltage level.

Thus, it is important to prevent the MCU included in the electronic device from malfunctioning according to changes of the supplied voltage level. To substantially prevent this malfunction, the MCU monitors whether the supplied voltage level becomes lower than a predetermined reference voltage level.

When the voltage level supplied to the MCU is lower than the predetermined reference voltage level, or becomes higher than the predetermined reference voltage level through battery change or charge, the MCU may perform a reset operation to prevent a malfunction before performing a normal operation. The electronic device using the battery/batteries includes low voltage detectors (LVDs) which detect the voltage level supplied from the battery/batteries.

FIG. 1 is a graph showing an operation state of an MCU depending on a battery voltage level. FIG. 2 is a flowchart of a method of operating an MCU according to a supplied battery voltage level. Referring to FIGS. 1 and 2, a first reference voltage level VLVD denotes a minimum voltage level by which the MCU can normally operate. A second reference voltage level VPOR denotes a minimum voltage level by which data can be stored in a data register (not shown) or a memory (not shown) included in the MCU.

Therefore, as shown in FIG. 1 when a voltage level Vb applied to the MCU is equal to or greater than the first reference voltage level VLVD, the MCU operates normally in an operation state A. When the voltage level Vb applied to the MCU is lower than the first reference voltage level VLVD and is higher than the second reference voltage level VPOR, a normal operation of the MCU is not guaranteed. Here, the MCU is in an operation state B.

When the voltage level Vb applied to the MCU is lower than the second reference voltage level VPOR, the MCU cannot normally operate. Here, the MCU is in an operation state C. When a battery is initially connected to the MCU or the MCU is initially charged, the MCU starts a reset operation, in block S105. The MCU initializes the data register and is prepared to normally operate, in block S110. The MCU normally operates in block S115 and enters into a stop mode in response to a stop command received from a CPU, in blocks S120 and S125.

In the stop mode, a clock for operating the MCU is stopped by the CPU, and an LVD is also turned off. When no external interrupts are applied to the MCU in the stop mode, the MCU keeps the stop mode, in block S130. When an external interrupt is applied to the MCU in the stop mode, the LVD is turned on, in blocks S130 and S135. The LVD checks whether the voltage level of the battery is higher than the first reference voltage level VLVD.

When the checked voltage level of the battery is higher than the first reference voltage level VLVD, the MCU performs a normal operation, and when the execution of the normal operation is completed, the MCU enters into the stop mode in response to the stop command in blocks S140 and S115.

When the external interrupt is applied to the MCU in the stop mode, and the voltage level Vb of the battery checked by the LVD is lower than the first reference voltage level VLVD, the MCU cannot normally operate and an operational error may be generated. This status is called a HALT status. In the HALT status of the MCU, the LVD maintains a turn on status, and checks the voltage level Vb received from the battery, in block S150.

When the checked voltage level Vb of the battery is lower than the first reference voltage level VLVD, the MCU maintains the HALT status in blocks S150 and S145. When the checked voltage level Vb of the battery becomes higher than the first reference voltage level VLVD by changing or charging the battery, the MCU performs a reset operation before performing a normal operation, in order to perform an error-less normal operation, in blocks S150 and S105.

When the voltage level Vb of the battery supplied to the MCU becomes lower than the second voltage level VPOR, data cannot be stored in the data register or the memory device included in the MCU, and thus an operation of the MCU cannot be guaranteed any more.

Hence, when the voltage level Vb of the battery becomes the voltage level VLVD by which the MCU can perform a normal operation by changing or charging the battery the MCU is initialized by performing the reset operation before performing the normal operation.

In the operation status B in which the MCU can store data but cannot normally operate, that is, when the voltage level Vb of the battery applied to the MCU is in between the first reference voltage level VLVD and the second reference voltage level VPOR, the MCU performs the reset operation before performing the normal operation. Although the conventional MCU in the operation status B can store data, the MCU is initialized by performing the reset operation in order to perform the normal operation. This initialization causes battery consumption and a reduction of the data retention time of the MCU.

Therefore, a need exists for an MCU capable of increasing a data retention time.

SUMMARY OF THE INVENTION

According to an embodiment of the present invention a method of operating a micro controller unit comprises maintaining a stop mode operation, using the micro controller unit, when a battery level detected in response to a first interrupt signal from an external source is in a predetermined low voltage level range during the stop mode operation, and performing a normal operation, using the micro controller unit, corresponding to a second interrupt signal from the external source without performing a reset operation, when a battery voltage level detected in response to the second interrupt signal is higher than a highest voltage level belonging to the predetermined low voltage level range.

According to another embodiment of the present invention, a method of operating a micro controller unit includes detecting a battery voltage level supplied from an external source in response to a first interrupt signal input from the external source, performing a stop operation when a detected battery voltage level is in a predetermined voltage level range, re-detecting a battery voltage level supplied from the external source in response to a second interrupt signal from the external source, during the stop operation, and performing a normal operation corresponding to the second interrupt signal when the re-detected battery voltage level is higher than a highest voltage level belonging to the predetermined voltage level range.

According to another embodiment of the present invention, a micro controller unit includes a low voltage detection block detecting a battery voltage level supplied from an external source in response to an interrupt signal and outputting an operation mode control signal on the basis of a detected battery voltage level; and a reset signal generation unit generating a system reset signal on the basis of the operation mode control signal, wherein the low voltage detection block generates the operation mode control signal for disabling the reset signal generation unit, when the detected battery voltage level is in a predetermined voltage level range.

According to another embodiment of the present invention, an electronic device includes a battery power unit supplying a battery voltage, and a micro controller unit operating using the battery voltage supplied from the battery power unit. The electronic device may be a remote controller.

BRIEF DESCRIPTION OF THE DRAWINGS

The present invention will become more apparent by describing in detail exemplary embodiments thereof with reference to the attached drawings in which.

DETAILED DESCRIPTION OF EXEMPLARY EMBODIMENTS

Figure 1:
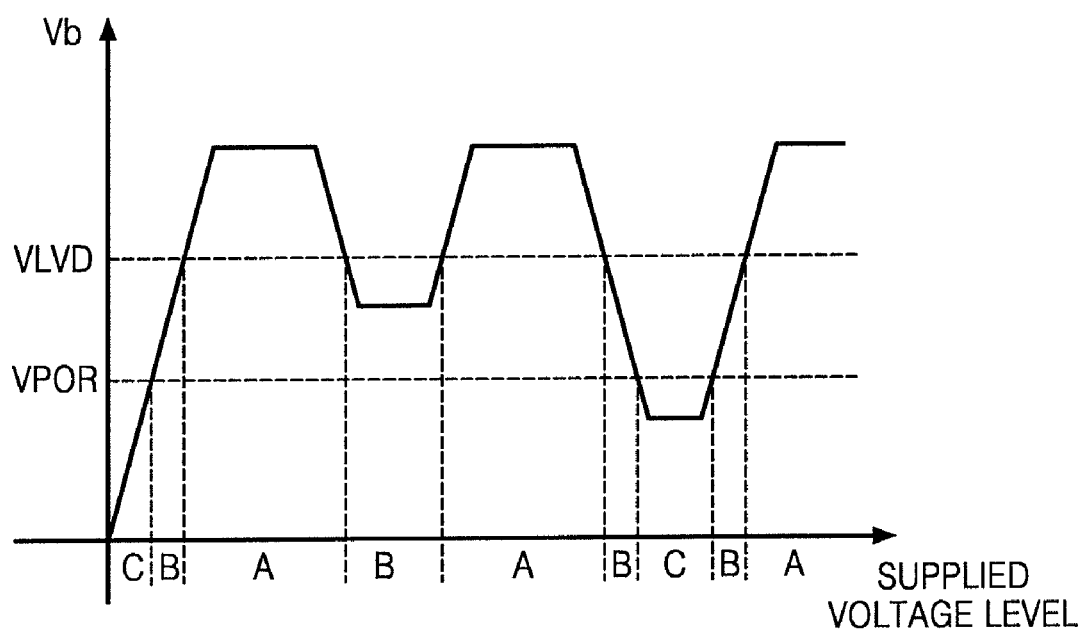
FIG. 1 is a graph showing operation statuses of a micro controller unit (MCU) according to a voltage level supplied from a battery.
Figure 2:
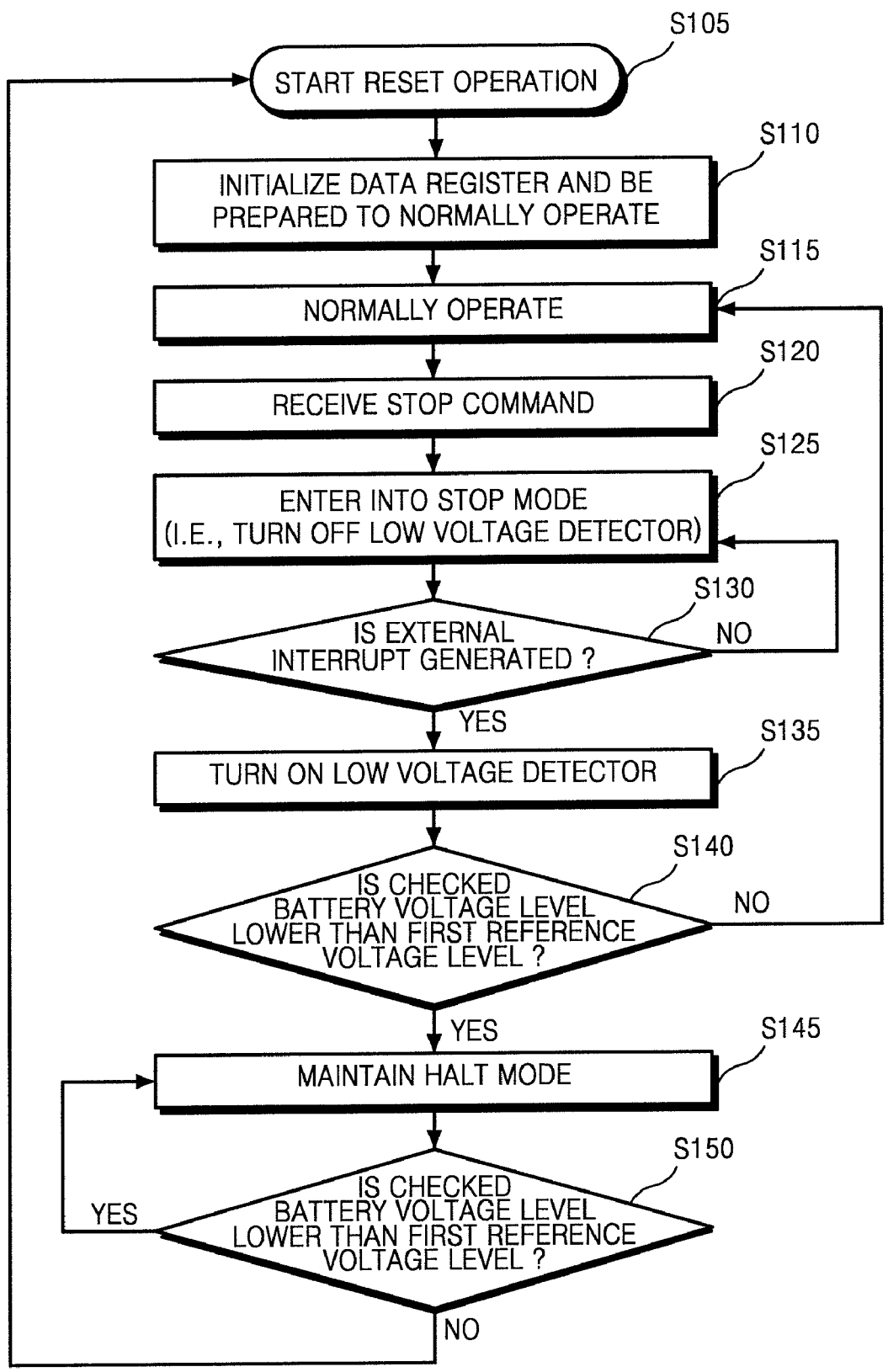
FIG. 2 is a flowchart of a conventional method of operating a MCU according to a voltage level supplied from a battery.
Figure 3:
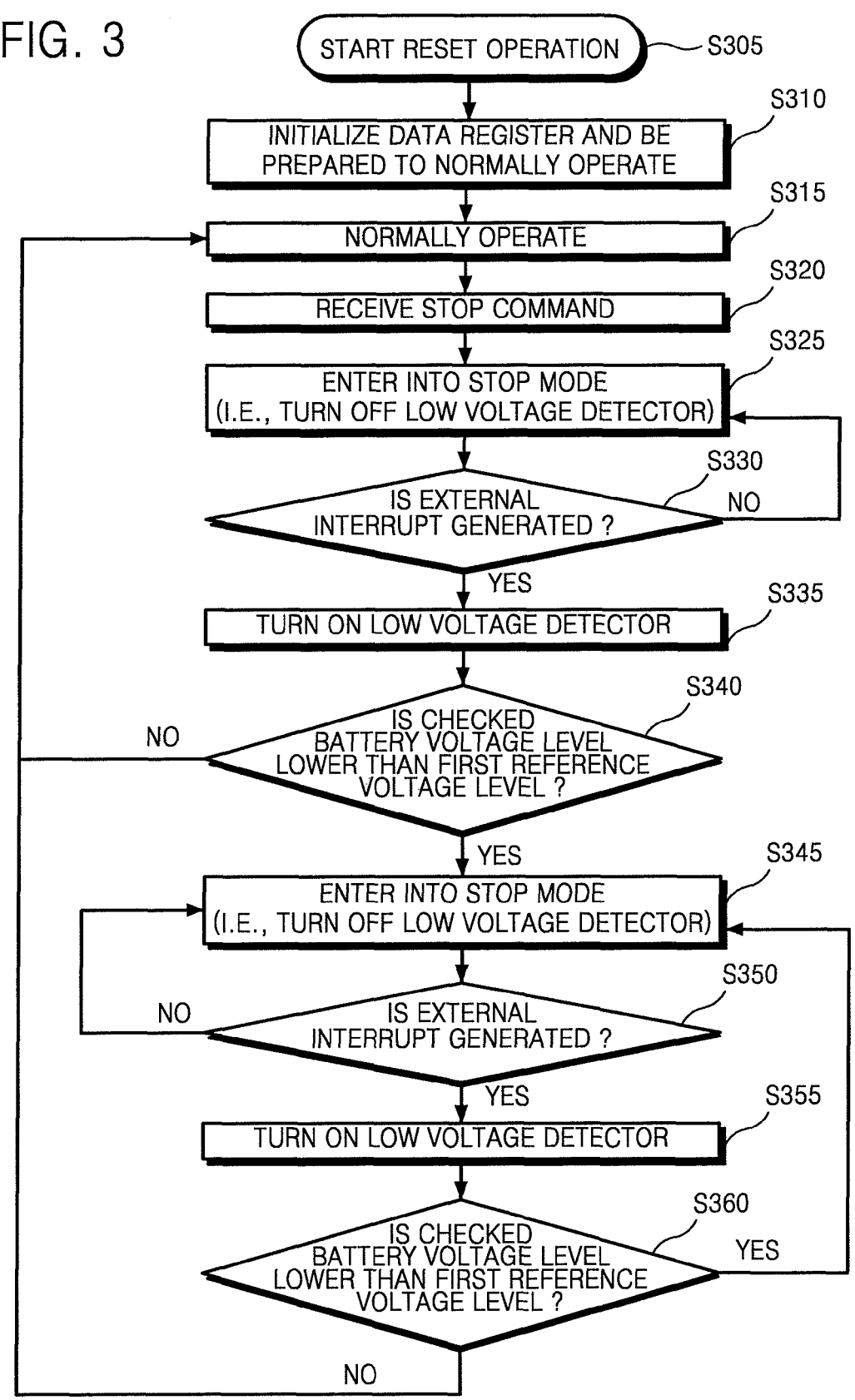
FIG. 3 is a flowchart of a method of operating a MCU according to embodiments of the present invention.

FIG. 3 is a flowchart of a method of operating a micro controller unit (MCU) according to embodiments of the present invention. Referring to FIG. 1 and FIG. 3, when a battery voltage is supplied to a MCU included in an electronic device by changing a battery or charging the battery of the electronic device, the MCU performs a reset operation, in block S305. By the reset operation, a data register (not shown) and a control register (not shown) of the MCU are initialized in block S310. After the initialization is completed, the MCU can perform a normal operation in block S315.

The MCU enters into a stop mode in response to a stop command received from a CPU included in the MCU in blocks S320 and S325. The CPU outputs a first control signal when the MCU completes the normal operation. A clock generator for generating a clock signal to operate the MCU, and a low level detector (LVD) are disabled in response to the first control signal.

Accordingly, the CPU of the MCU and its peripheral circuits which operate in response to the clock signal, are converted into a non-operation status. The MCU in the stop mode maintains the stop mode as long as no external interrupt signals are received at block S330. The MCU in the stop mode responds to a first external interrupt signal and enables the LVD in block S335. The LVD detects the battery voltage level in block S340.

When the detected battery voltage level is higher than the first reference voltage level, the MCU performs a normal operation corresponding to the first external interrupt signal. When the detected battery voltage level is in a predetermined low voltage level range, the MCU maintains the stop mode in block S345.

For example, when the detected voltage level is lower than the first reference voltage level (such as, VLVD shown in FIG. 1) and is higher than a second reference voltage level (such as, VPOR shown in FIG. 1), the MCU maintains the stop mode. At this time, the enabled LVD is disabled.

The LVD is enabled in response to a second external interrupt signal in blocks S350 and S355. The enabled LVD detects the battery voltage level received from an external source, and maintains the stop mode when the detected battery voltage level is in the predetermined low voltage level range in blocks S360 and S345.

When the detected battery voltage level is higher than the highest voltage level existing within the predetermined low voltage level range (such as, the first reference voltage level VLVD) by battery change or charge, the MCU performs a normal operation corresponding to the second interrupt signal in blocks S360 and S315. The MCU does not perform a reset operation before performing the normal operation corresponding to the second interrupt signal.

In the MCU operating method according to an embodiment of the present embodiment, the MCU performs the normal operation corresponding to the second interrupt signal without performing the reset operation, so that the power consumption of the MCU due to the reset operation is not generated, and the data retention time of the MCU increases.

Although not shown in FIG. 3, when the detected battery voltage level is lower than the lowest voltage level within the predetermined low voltage level range (such as, the second reference voltage level VPOR) by a further discharge of the battery, the MCU should perform the reset operation before performing the normal operation, in order to substantially prevent a malfunction of the MCU which may occur without the reset operation.

Figure 4:
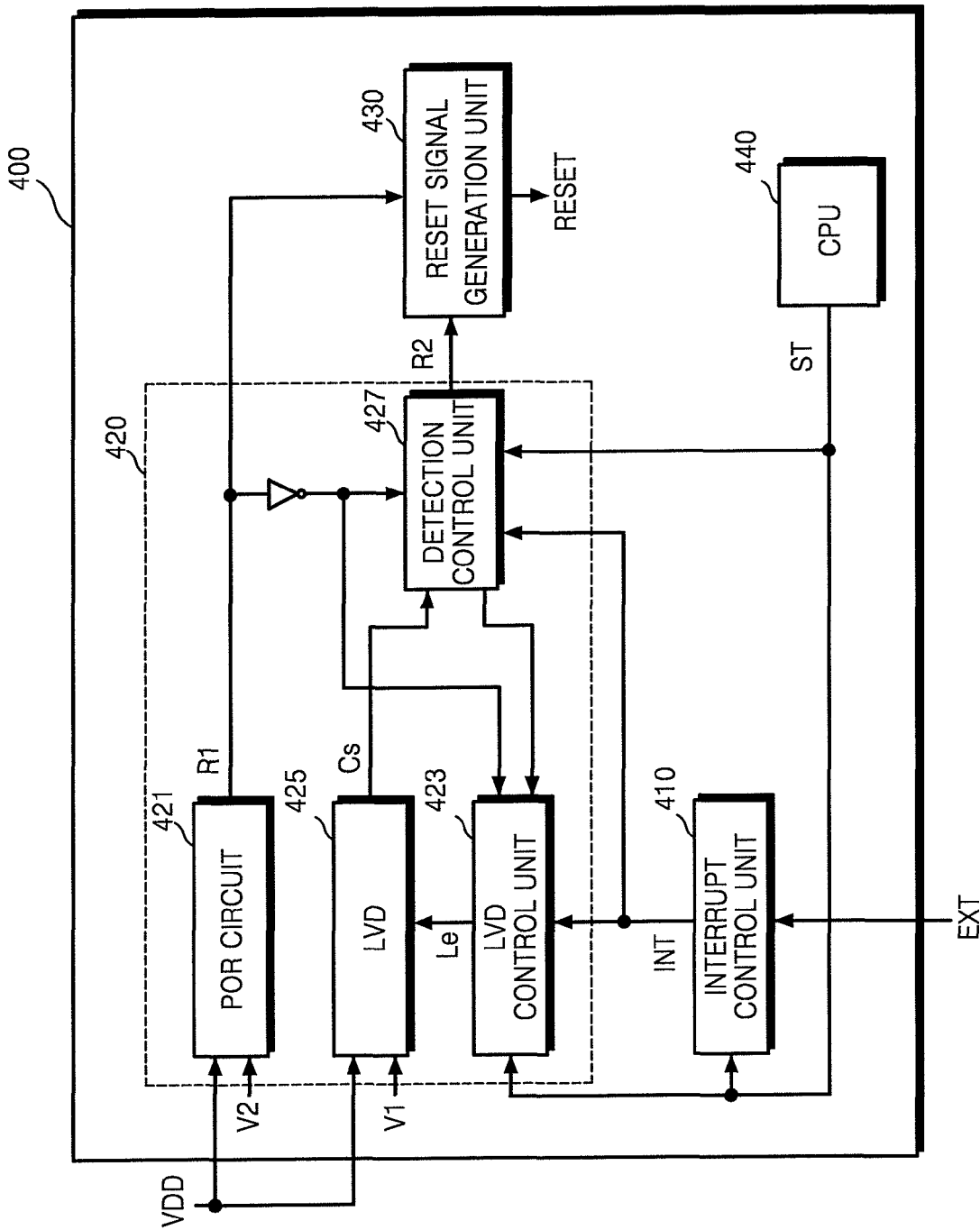
FIG. 4 is a block diagram of a MCU according to embodiments of the present invention.

FIG. 4 is a block diagram of a MCU 400 according to embodiments of the present invention. Referring to FIG. 4, the MCU 400 includes an interrupt control unit 410, a low voltage detection block 420, a reset signal generation unit 430, and a CPU 440. The interrupt control unit 410 receives an external interrupt signal EXT and outputs an interrupt signal INT in response to the received external interrupt signal EXT.

The low voltage detector block 420 includes a POR circuit 421, a LVD circuit and a detection control unit 427. The POR circuit 421 monitors a battery voltage VDD of supplied from an external source. The POR circuit 421 outputs a first reset enable signal R1 for generating a reset signal RESET, when the battery voltage VDD is lower than a second reference voltage level V2, (for example, the voltage level VPOR shown in FIG. 1).

The second reference voltage level V2 may be a minimum voltage for ensuring retention of the data stored in a memory device (not shown, such as, a RAM) included in the MCU 400. The LVD circuit includes a LVD control unit 423 and an LVD 425. The LVD control unit 423 receives the interrupt signal INT and outputs a LVD enable signal Le for enabling the LVD 425 in response to the received interrupt signal INT.

The LVD 425 is enabled in response to the LVD enable signal Le. The LVD 425 compares the battery voltage level VDD supplied from the external source with the first reference voltage V1 (such as, VLVD shown in FIG. 1) and outputs a comparison signal Cs on the basis of the comparison result. The first reference voltage V1 may be a minimum voltage by which the MCU 400 can perform a normal operation.

The detection control unit 427 is enabled in response to the interrupt signal INT. The enabled detection control unit 427 outputs a second reset enable signal R2 for enabling the reset signal generation unit 430, on the basis of the comparison signal Cs.

The reset signal generation unit 430 outputs a reset signal RESET for resetting the MCU 400, on the basis of the first reset enable signal R1 or the second reset enable signal R2. For example, the reset signal generation unit 430 may be implemented as a NOR gate, for example, when the supplied battery voltage VDD is lower than the first reference voltage V1 (such as, VLVD shown in FIG. 1), the comparison signal Cs may be in a logic low level, and the second reset enable signal R2 may also be in a logic low level.

When the battery voltage VDD is higher than the second reference voltage level V2, the first enable signal R1 may be in a logic high level. At this time, the reset signal generation unit 430, implemented as the NOR gate, generates a reset signal RESET with a logic low level. On the other hand, when the battery voltage level VOD is lower than the second reference voltage level V2, the first enable signal R1 may be in a logic low level, and the reset signal generation unit 430, implemented as the NOR gate, generates a reset signal RESET with a logic high level.

The MCU 400 may be reset in response to the reset signal RESET with the logic high level. The reset signal RESET may be a system reset signal to reset an electronic device including the MCU 400. When the MCU 400 enters into a stop mode, the CPU 440 outputs a stop signal ST for disabling at least one of a clock generator (not shown) for generating a clock signal, the interrupt control unit 410, the LVD control unit 423, and the detection control unit 427. Hence, the peripheral circuits (not shown) of the MCU 400 and the CPU 440, which operate in synchronization with the clock signal, are converted into a non-operation status. The CPU 400 may be enabled in response to the interrupt signal INT.

Figure 5:
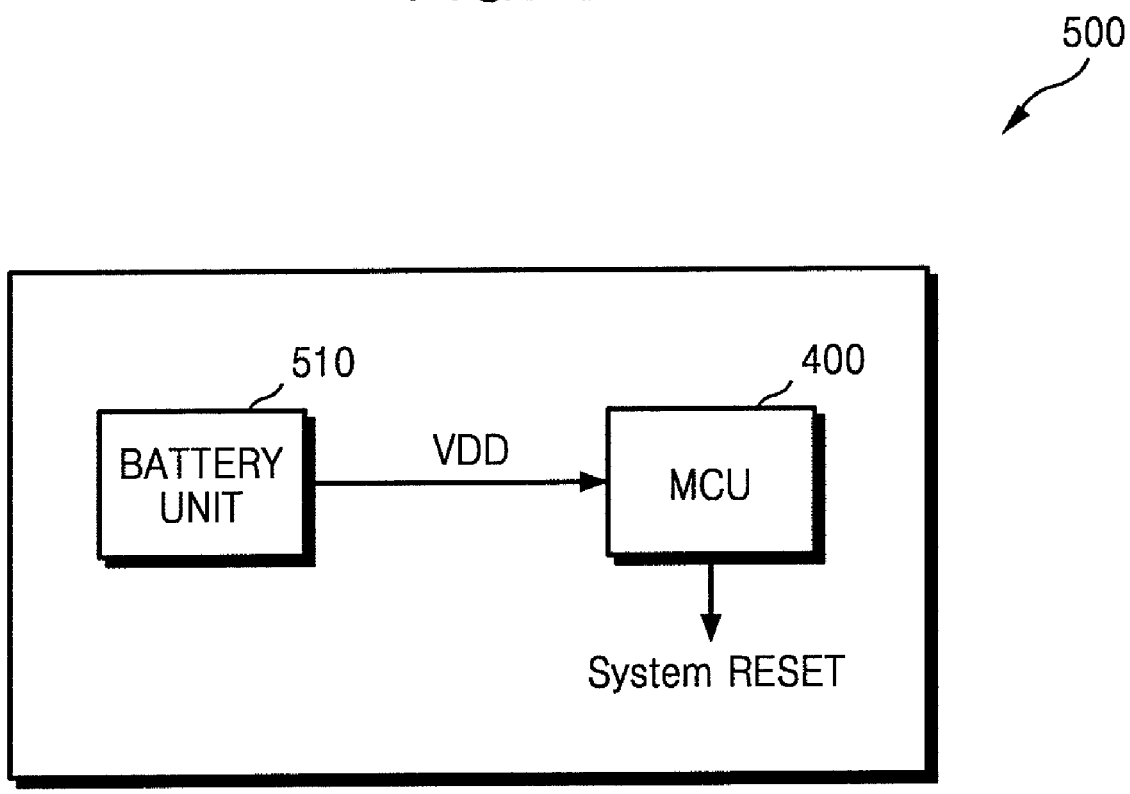
FIG. 5 is a block diagram of an electronic device including the MCU shown in FIG. 4.

FIG. 5 is a block diagram of an electronic device 500 including the MCU 400 shown in FIG. 4. Referring to FIG. 5, the electronic device 500 includes a battery unit 510 and the MCU 400. The electronic device 500 may be a remote controller, a cellular phones a personal digital assistant (PDA), and a portable multimedia player (PMP), or the like. The battery unit 510, as a power supply source of the electronic device 500, supplies the battery voltage VDD to the MCU 400.

The MCU 400 operates using the battery voltage VDD supplied from the battery unit 510. The MCU 400 monitors the battery voltage level VDD. According to the monitored battery voltage level, the MCU 400 determines whether to perform a reset operation, before performing a normal operation. The MCU 400 may be constructed as described herein with reference to in FIG. 4. The reset signal RESET, generated by the reset signal generation unit 430 may be a system reset signal System RESET for resetting the electronic device 500.

As mentioned herein a method of driving an MCU of an electronic device using a battery according to an embodiment of the present invention can increase the data retention time of the MCU.

While the present invention has been particularly shown and described with reference to exemplary embodiments thereof it will be understood by those of ordinary skill in the art that various changes in form and details may be made therein without departing from the spirit and scope of the disclosure.

What is claimed is:

1. A method of operating a micro controller unit comprising:

maintaining a stop mode operation, using the micro controller unit, when a battery level detected in response to a first interrupt signal from an external source is in a predetermined low voltage level range during the stop mode operation; and performing a normal operation, using the micro controller unit, corresponding to a second interrupt signal from the external source without performing a reset operation, when a battery voltage level detected in response to the second interrupt signal is higher than a highest voltage level belonging to the predetermined low voltage level range, wherein upon receiving at least one of the first and second interrupt signals:

turning on a low voltage detector in response to a respective received interrupt signal and detecting the battery voltage level supplied from the external using a turned-on low voltage detector; and turning off the turned-on low voltage detector and maintaining the stop mode operation, when the detected battery voltage level is in the predetermined low voltage level range.

2. The method of claim 1, further comprising maintaining the stop mode operation using the micro controller unit when the battery voltage level detected in response to the second interrupt signal is in the predetermined low voltage level range.

3. A method of operating a micro controller unit, the method comprising:

detecting a battery voltage level supplied from an external source in response to a first interrupt signal input from the external source;

performing a stop operation when a detected battery voltage level is in a predetermined voltage level range;

re-detecting a battery voltage level supplied from the external source in response to a second interrupt signal from the external source, during the stop operation; and performing a normal operation corresponding to the second interrupt signal when the re-detected battery voltage level is higher than a highest voltage level belonging to the predetermined voltage level range, wherein upon receiving at least one of the first and second interrupt signals:

turning on a low voltage detector in response to a respective received interrupt signal and detecting the battery voltage level supplied from the external using a turned-on low voltage detector; and turning off the turned-on low voltage detector and maintaining the stop mode operation, when the detected battery voltage level is in the predetermined low voltage level rang.

4. The method of claim 3, wherein the performance of the normal operation is executed without performing a reset operation.

5. A micro controller unit comprising:
a low voltage detection block detecting a battery voltage level supplied from an external source in response to an interrupt signal and outputting an operation mode control signal on the basis of a detected battery voltage level; and
a reset signal generation unit generating a system reset signal on the basis of the operation mode control signal,
wherein the low voltage detection block generates the operation mode control signal for disabling the reset signal generation unit, when the detected battery voltage level is in a predetermined voltage level range.

6. The micro controller unit of claim 5, wherein the low voltage detection block is disabled in response to a stop command output from a processor.

7. The micro controller unit of claim 6, further comprising an interrupt control unit which is enabled in response to an external interrupt signal and generates the interrupt signal.

8. The micro controller unit of claim 7, wherein the low voltage detection block comprises:
a first low voltage detection circuit which is enabled in response to the interrupt signal, compares the battery voltage level supplied from the external source with a first reference voltage level, and outputs a first comparison signal on the basis of a comparison result; and
a detection control unit which is enabled in response to the interrupt signal and outputs the operation mode control signal on the basis of the first comparison signal.

9. The micro controller unit of claim 8, wherein the low voltage detection block further comprises a second low voltage detection circuit comparing the battery voltage level supplied from the external source with a second reference voltage level and outputting a second comparison signal on the basis of the comparison result,
wherein the detection control unit generates the operation mode control signal for disabling the reset signal generation unit on the basis of the first comparison signal and the second comparison signal.

10. The micro controller unit of claim 9, wherein the first low voltage detection circuit comprises:
a low voltage detector enabling unit which is turned on in response to the interrupt signal and generates a low voltage detector enabling signal; and
a low voltage detector which is turned on in response to the low voltage detector enabling signal, compares the battery voltage level supplied from the external with the first reference voltage level, and outputs the first comparison signal on the basis of the comparison result.

11. An electronic device comprising:
a battery power unit supplying a battery voltage; and
a micro controller unit operating using the battery voltage supplied from the battery power unit,
wherein the micro controller unit comprises:
a low voltage detection block detecting a battery voltage level supplied from an external source in response to an interrupt signal and outputting an operation mode control signal according to a detected battery voltage level; and
a reset signal generation unit generating a system reset signal according to the operation mode control signal,
wherein the low voltage detection block generates the operation mode control signal for disabling the reset signal generation unit, when the detected battery voltage level is in a predetermined voltage level range.

12. The electronic device of claim 11, wherein the electronic device is a remote controller.

* * * * *